(12) United States Patent
Tokuda

(10) Patent No.: US 12,147,220 B2
(45) Date of Patent: Nov. 19, 2024

(54) PLANT OPERATION OPTIMIZATION SUPPORT DEVICE, PLANT OPERATION OPTIMIZATION CONTROL DEVICE AND METHOD

(71) Applicant: Hitachi, Ltd., Tokyo (JP)

(72) Inventor: Yuya Tokuda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 319 days.

(21) Appl. No.: 17/635,805

(22) PCT Filed: Feb. 8, 2021

(86) PCT No.: PCT/JP2021/004672
§ 371 (c)(1),
(2) Date: Feb. 16, 2022

(87) PCT Pub. No.: WO2021/181979
PCT Pub. Date: Sep. 16, 2021

(65) Prior Publication Data
US 2022/0326694 A1    Oct. 13, 2022

(30) Foreign Application Priority Data

Mar. 11, 2020   (JP) .................................. 2020-041671

(51) Int. Cl.
*G05B 19/418*   (2006.01)

(52) U.S. Cl.
CPC ................ *G05B 19/41835* (2013.01); *G05B 2219/37591* (2013.01)

(58) Field of Classification Search
CPC .... G05B 19/41835; G05B 2219/37591; G05B 13/024
See application file for complete search history.

(56) References Cited

U.S. PATENT DOCUMENTS

| | | | | |
|---|---|---|---|---|
| 2004/0049299 A1* | 3/2004 | Wojsznis | ............. | G05B 13/042 |
| | | | | 700/28 |
| 2005/0149209 A1* | 7/2005 | Wojsznis | ............. | G05B 13/048 |
| | | | | 700/52 |
| 2018/0136618 A1* | 5/2018 | Linn | ..................... | G05B 13/048 |

FOREIGN PATENT DOCUMENTS

| | | |
|---|---|---|
| JP | 63-310001 A | 12/1988 |
| JP | 2002-157003 A | 5/2002 |

OTHER PUBLICATIONS

International Search Report, PCT/JP2021/004672, Apr. 13, 2021, 2 pgs.

* cited by examiner

*Primary Examiner* — Christopher E. Everett
(74) *Attorney, Agent, or Firm* — Volpe Koenig

(57) ABSTRACT

The purpose of the present invention is to provide a plant operation optimization assistance device, a plant operation optimization control device, and a method, which enable a reduction in computational load. The plant operation optimization assistance device is characterized by comprising: an input unit for inputting, as an input signal, an operation amount signal assigned to a plant and a process signal detected at the plant; a sensitivity estimation unit for taking, as a sensitivity signal, a time change amount of the process signal with respect to the operation amount signal; and a signal classification unit for sorting operational states of the plant from the input signal and giving an operational state signal, and also extracting, as a state-specific high-sensitivity signal, a sensitivity signal indicating high-sensitivity, from among sensitivity signals, for each of the sorted operational states.

4 Claims, 9 Drawing Sheets

FIG. 10

| | STATE ID OF TRANSITION DESTINATION (Sj) | | | | |
|---|---|---|---|---|---|
| | $S_1$ | $S_2$ | $S_3$ | $S_4$ | $S_5$ |
| $S_1$ | 0.14 | 0.15 | 0.09 | 0.08 | 0.25 |
| $S_2$ | 0.06 | 0.07 | 0.11 | 0.95 | 0.31 |
| $S_3$ | 0.06 | 0.04 | 0.07 | 0.08 | 0.38 |
| $S_4$ | 0.08 | 0.05 | 0.03 | 0.06 | 0.32 |
| $S_5$ | 0.07 | 0.04 | 0.02 | 0.02 | 0.46 |

OUTPUT SCREEN: ATTENUATED STATE TRANSITION MATRIX D

STATE ID OF TRANSITION SOURCE (Si)

| STATE ID OF TRANSITION SOURCE (Si) | $S_1$ | $S_2$ | $S_3$ | $S_4$ | ... | $S_n$ |
|---|---|---|---|---|---|---|
| REWARD | 0.00 | 0.00 | 1.00 | 0.00 | ... | 0.00 |

| STATE ID OF TRANSITION SOURCE (Si) | $S_1$ | $S_2$ | $S_3$ | $S_4$ | ... | $S_n$ |
|---|---|---|---|---|---|---|
| VALUE | 0.89 | 0.90 | 1.00 | 0.90 | ... | 0.01 |

FIG. 13

| STATE ID OF TRANSITION SOURCE (Si) | $S_1$ | $S_2$ | $S_3$ | $S_4$ | ... | $S_n$ |
|---|---|---|---|---|---|---|
| STATE ID OF TRANSITION DESTINATION (Sj) | $S_2$ | $S_3$ | $S_3$ | $S_3$ | ... | $S_5$ |

FIG. 14

| STATE ID OF TRANSITION SOURCE (Si) | $S_1$ | $S_2$ | $S_3$ | $S_4$ | ... | $S_n$ |
|---|---|---|---|---|---|---|
| OPERATION AMOUNT ID (a1) | $a_{21}$ | $a_6$ | $a_2$ | $a_5$ | ... | $a_n$ |

PLANT OPERATION OPTIMIZATION SUPPORT DEVICE, PLANT OPERATION OPTIMIZATION CONTROL DEVICE AND METHOD

TECHNICAL FIELD

The present invention relates to a plant operation optimization support device, a plant operation optimization control device, and a method for supporting a plant operation and optimizing the operation with a low calculation load.

BACKGROUND ART

In various plants, there is a tendency to configure a plant operation optimization control device so as to maximize the plant efficiency. For example, the plant operation optimization control device in Patent Literature 1 is configured as "a multivariable model prediction control device including: a control amount variation predicting means for predicting a future variation in each control amount from a point to be controlled, by a neutral network model of inputting the state amount including an operation amount, a disturbance, and a control amount of the process to be controlled and outputting the control amount; a control amount sensitivity calculation means for calculating sensitivity of a variation amount of each control amount with respect to a variation amount of each operation amount to be given from this time, according to the state amount of the point to be controlled; and an optimization calculation determining means for calculating the optimization so that each control amount predicted by the variation predicting means may agree with a predetermined target value as much as possible and that the variation amount of the operation amount may be as small as possible, by using the sensitivity matrix obtained through the calculation by the control amount sensitivity calculating means, the above device in which each operation amount determined by the optimization calculating and determining means is output to the outside as the operation amount of the process to be controlled".

CITATION LIST

Patent Literature

[Patent Literature 1] Japanese Patent Laid-Open No. 2002-157003

SUMMARY OF INVENTION

Technical Problem

The plant operation optimization control device disclosed in Patent Literature 1 makes it possible to operate a plant while maintaining a high operating efficiency. However, there is a problem that the calculation load is large when the above is realized using a computer device. This is due to the fact that in Patent Literature 1, the plant always handles all the sensor signals as input. In the field of industrial plants, the application of the optimum control technology through machine learning is being tried in order to improve the efficiency, and there is a need to reduce the load required for calculating the control amount.

In addition, while reducing the load required for the calculation of the control amount, it is desired to extract the amount of highly sensitive sensor information, to retain highly sensitive signals even after contraction also in a low-frequency operation (special operation), and to be able to follow a change in the plant condition.

The invention aims to provide a plant operation optimization support device, a plant operation optimization control device, and a method that can reduce the calculation load by autonomously extracting the signals essential for achieving the control target from all the sensor signals of the plant.

Solution to Problem

In order to achieve the above, in the invention, "a plant operation optimization support device is characterized by including: an input unit that inputs an operation amount signal provided to a plant and a process signal detected in the plant as input signals; a sensitivity estimation unit that requires a time-series change of the process signal as for the operation amount signal, as a sensitivity signal; and a signal classification unit that classifies an operation state of the plant from the input signals to provide an operation state signal and that extracts the sensitivity signal indicating a high sensitivity from the sensitivity signals in every classified operation state, as a state-classified high sensitivity signal".

Further, in the invention, "a plant operation optimization control device is characterized by including: an input unit that inputs an operation amount signal provided to a plant and a process signal detected by the plant as input signals; a sensitivity estimation unit that requires a time-series change of the process signal as for the operation amount signal, as a sensitivity signal; a signal classification unit that classifies an operation state of the plant from the input signals to provide an operation state signal and that extracts the sensitivity signal indicating a high sensitivity from the sensitivity signals in every classified operation state, as a state-classified high sensitivity signal; a control rule optimization unit that, on receipt of the state-classified high sensitivity signal, determines a control rule in a plant control for transition to a target state and provides the above as a control rule signal, when a high efficiency operation state of the plant is defined as the target state; and a control device that determines the operation amount signal provided to the plant using the control rule obtained from the state-classified high sensitivity signal during a time of the operation state signal".

Further, in the invention, "a plant operation optimization support method is characterized by including: a step of inputting an operation amount signal provided to a plant and a process signal detected by the plant as input signals; a step of requiring a time-series change of the process signal as for the operation amount signal, as a sensitivity signal; and a step of classifying an operation state of the plant from the input signals to provide an operation state signal and extracting the sensitivity signal indicating a high sensitivity from the sensitivity signals in every classified operation state, as a state-classified high sensitivity signal".

Further, in the invention, "a plant operation optimization control method is characterized by including: a step of inputting an operation amount signal provided to a plant and a process signal detected by the plant as input signals; a step of requiring a time-series change of the process signal as for the operation amount signal, as a sensitivity signal; a step of classifying an operation state of the plant from the input signals to provide an operation state signal and extracting the sensitivity signal indicating a high sensitivity from the sensitivity signals in every classified operation state, as a state-classified high sensitivity signal; a step of determining a control rule in a plant control for transition to a target state and providing the above as a control rule signal, using the state-classified high sensitivity signal, when a high efficiency operation state of the plant is defined as the target state; and a step of determining the operation amount signal provided to the plant using the control rule obtained from the state-classified high sensitivity signal during a time of the operation state signal".

It is possible to provide a plant operation optimization support device, a plant operation optimization control device, and a method that can reduce the calculation load by autonomously extracting the signals essential for achieving the control target from all the sensor signals of the plant.

BRIEF DESCRIPTION OF DRAWINGS

FIG. 10 is a view showing one example when the attenuated state transition matrix D calculated by a future state prediction calculation unit B21.

FIG. 11 is a view showing one example when a reward function is in a form of vector.

FIG. 12 is a view showing one example of a state value function V.

FIG. 13 is a view showing one example of the calculation results of the equation (4).

FIG. 14 is a view showing one example of a control rule.

DESCRIPTION OF EMBODIMENTS

Hereinafter, embodiments of the invention will be described using the drawings.

First Embodiment

Figure 1:
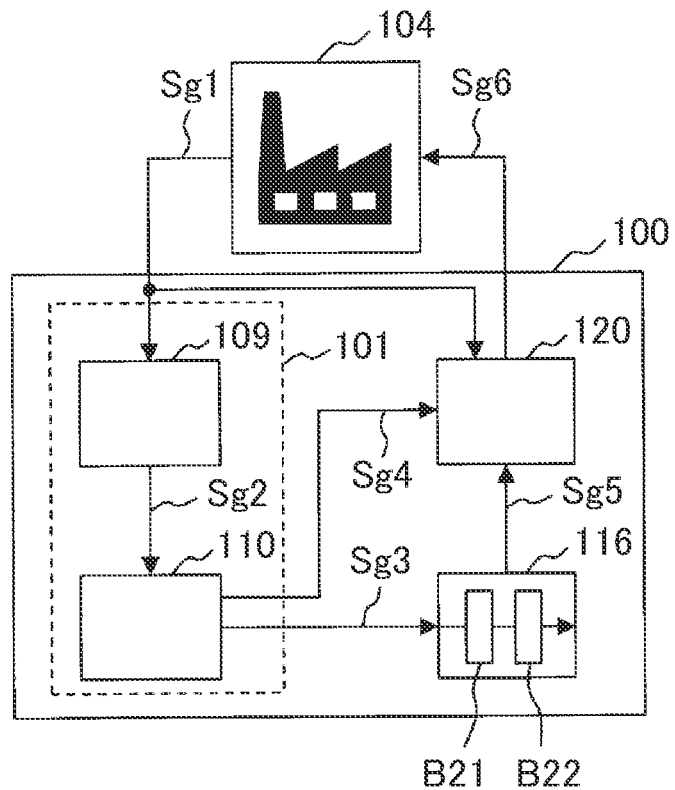
FIG. 1 is a view showing a constitutional example of a plant operation optimization control device according to a first embodiment of the invention.

FIG. 1 is a view showing a constitutional example of a plant operation optimization control device according to a first embodiment of the invention. In FIG. 1, a plant operation optimization control device 100 receives an input signal Sg1 from a plant 104 and provides an operation amount signal (control amount signal) Sg6 finally to the plant equipment, not illustrated, in the plant. Here, the input signal includes the operation amount signal Sg6 provided to the plant equipment and process signals detected by the sensors in the respective units of the plant.

The plant operation optimization control device 100 includes an information amount contraction device 101, a control rule optimization unit 116, and a control device 120 as its main components, and according to the signals Sg4 and Sg5 from these components, the control device 120 determines the operation amount signal Sg6 for the plant equipment, not illustrated, in the plant.

The invention may be configured also as a plant operation optimization support device in FIG. 1. In this case, it may be configured to present various data provided by the information amount contraction device 101 or further the control rule optimization unit 116 to a user through a display device such as a monitor, and the control device 120 reflects on itself, the presented data using the information judged and selected by its own and operates the device, hence to enable the optimization operation of the plant 140 indirectly.

The information amount contraction device 101 is formed by a sensitivity estimation unit 109 and a signal classification unit 110. In the sensitivity estimation unit 109, a relation of the process signal as the plant output to the operation amount signal Sg6 given to the plant 104 as a disturbance (plant input) is extracted as a time variation or a sensitivity signal. This means, for example, that when the operation amount signal Sg6 is defined as x, the process signal is defined as y, and the time is defined as t, dyt/dxt is obtained as the sensitivity signal at the time t. It is recommended that a variety of sensitivity signals should be prepared based on the assumable input and output relationship of the plant.

The signal classification unit 110 classifies the operation state of the plant 104 into a plurality of operation states using the statistical method such as clustering. For example, in the case of a boiler plant, the operation state can be exemplified such as a speed-up stage, a load increase stage, a constant load operation stage, and a load decrease stage; however, the classified operation states are not limited to these. In addition, in the invention, the classification of the operation state is not always performed by the clustering method but may be done by a proper method.

Figure 2:
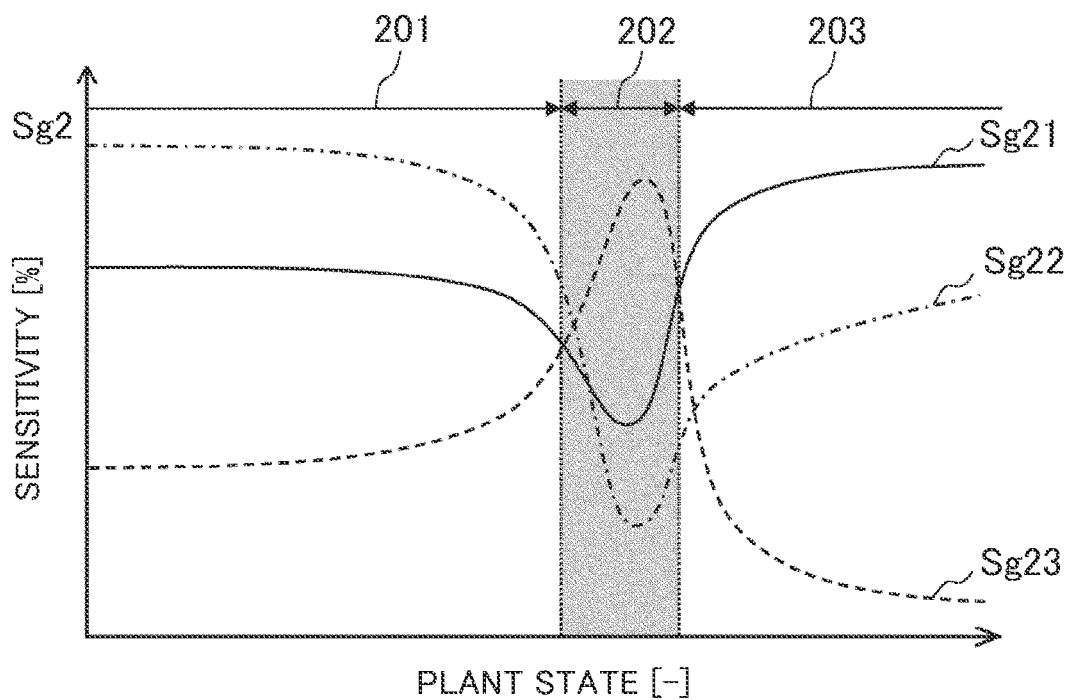
FIG. 2 is a view exemplifying a relationship between an operation state and a sensitivity signal.

FIG. 2 exemplifies a relationship between the operation state and a sensitivity signal Sg2. The horizontal axis shows the operation state of the plant, and the vertical axis shows the sensitivity signal. In this example, as the operation state of the plant on the horizontal axis, there are shown a normal operation state 201, a normal operation state 203, and a special operation state 202. Here, the special operation state represents an operation state that occurs less frequently than the normal operation state.

FIG. 2 shows that the sensitivity of the signal Sg2 varies according to the plant state. When the plant is within the range of the normal operation state 201, the sensitivity of the signal Sg22 is high; in the special operation state 202, that of the signal Sg23 is high; and in the normal operation state 203, the sensitivity of the signal Sg21 is high. Further, the signal Sg23 having a high sensitivity in the special operation state 202 that occurs less frequently tends to have a low sensitivity in the other operation that occurs frequently. Therefore, in the conventional sensitivity analysis method, the signal Sg23 is ranked low in the sensitivity and is unlikely to be selected as a signal after information contraction. Since the invention calculates the sensitivity $dy_t/dx_t$ at each time t, it is possible to extract a signal having a high sensitivity in the special operation state that occurs less frequently.

As mentioned above, the signal classification unit 110 extracts an operation state cluster signal Sg4 which means the discriminated operation state and a state-classified high sensitivity signal Sg3 which shows a high sensitivity in this operation state. The state-classified high sensitivity signal Sg3 to be selected is not limited to one but may be a plurality of signals having a high sensitivity. The combinations of the operation state cluster signals Sg4 and the state-classified high sensitivity signals Sg3 showing a high sensitivity in this operation state are stored in a proper database, and as the result, the operation states in the past are reflected and the contents of the database are enriched sequentially. This includes the information on the state-classified high sensitivity signals Sg3 in the operation state that occurs less frequently.

In this way, since the information amount contraction device 101 provides the current operation state and the high-sensitivity signal at this time, the handled information amount is selected from the total process amount, and the above device may be said to be provided with a function of contracting information.

The control rule optimization unit 116 is provided with a model function of simulating the characteristics of the plant, and it inputs the state-classified high sensitivity signal Sg3 indicating a high sensitivity in this operation state and determines the optimized control rule at this time. Here, the control rule means, for example, the operation amount of the plant. Operating the plant with the operation amount obtained from the state-classified high sensitivity signal Sg3 means that the plant input is minimized and that the plant output is maximized, hence to be able to realize a highly efficient operation. A concrete example of the method for realizing the control rule optimization unit 116 will be explained in detail in a fourth embodiment.

The control device 120 is a control unit that inputs the control rule signal Sg5 obtained by the control rule optimization unit 116, the operation state cluster signal Sg4 obtained by the signal classification unit 110, and the process signal Sg1. Generally, the control device 120 is formed by, for example, a proportional-integral adjustment function or a sequencer, and it uses the process signal Sg1 as a feedback signal or a correction signal to a predetermined target signal, to determine the operation amount signal Sg6 for the plant equipment. On the other hand, the control device 120 in the invention grasps the current operation state according to the operation state cluster signal Sg4, inputs the optimized control rule signal Sg5 for this operation state, which acts on each part of the control device 120, and corrects the operation amount signal Sg6 to the optimum value according to the control rule signal Sg5. As a method of acting on each part of the control device, there may be considered modification of the value to the optimum set value, modification to the time constant or gain to make the optimum adjustment function, application of a bias signal or the like.

Figure 3:
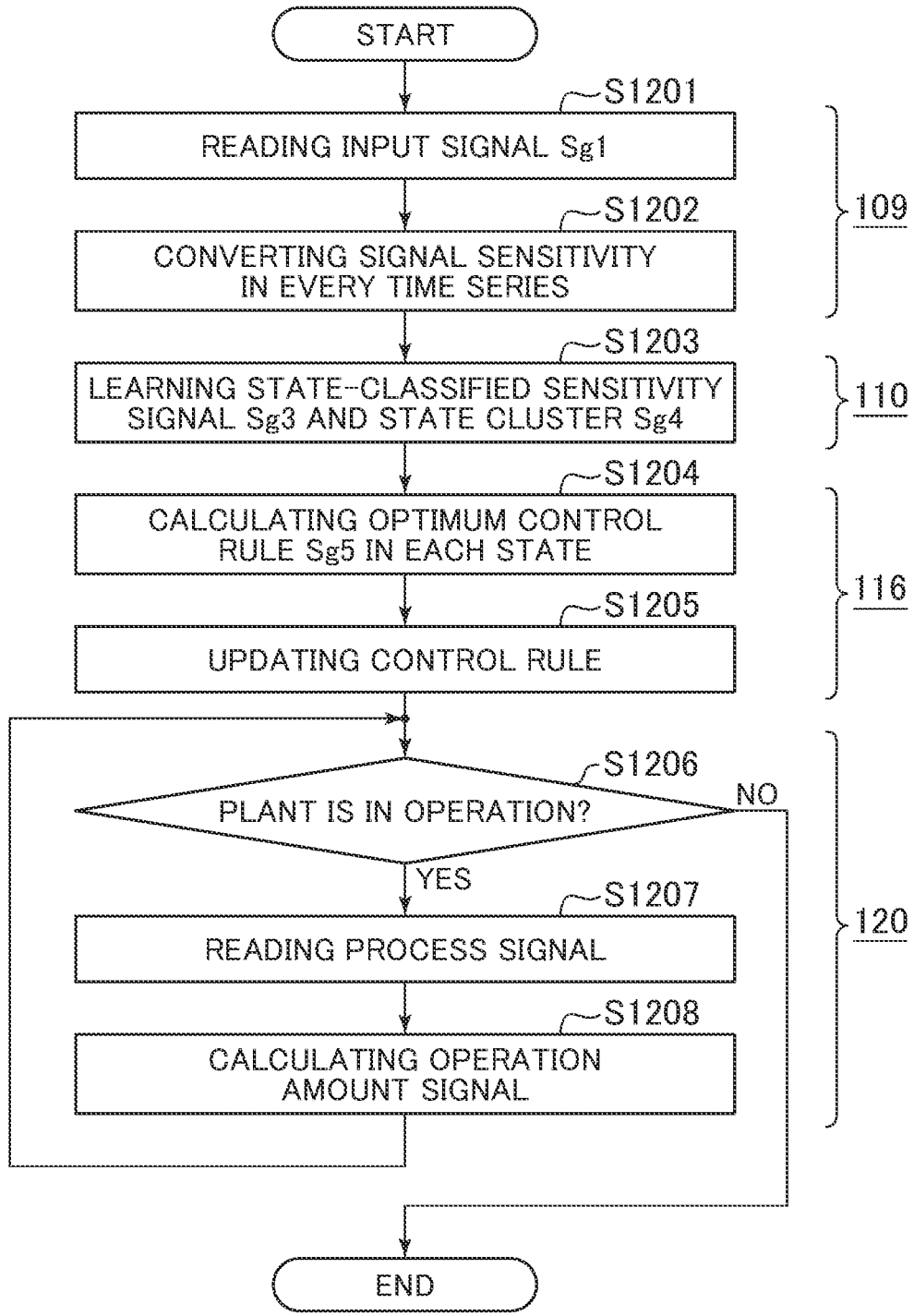
FIG. 3 is a flow chart showing a series of steps in the processing according to the first embodiment of the invention.

FIG. 3 is a flow chart showing a series of steps in the processing according to the first embodiment of the invention. In this figure, the right side of each processing step describes each unit in FIG. 1 that performs the corresponding function. According to this processing, at first, the input signal Sg1 such as the process signal is input in the processing step S1201 and converted into a sensitivity signal in time-series in the processing step S1202. In the processing step S1203, the operation state cluster signal Sg4 that means the discriminated operation state and the state-classified high sensitivity signal Sg3 that indicates a high sensitivity in this operation state, are extracted.

In the processing step S1204 corresponding to the control rule optimization unit 116, the optimum control rule signal Sg5 for this state is calculated from the state-classified high sensitivity signal Sg3, and in the processing step S1205, the control rule is properly updated according to the operation state.

In the processing steps S1206 to S1028 corresponding to the control device 120, at first, it is judged whether the plant is in operation in the processing step S1206; when the plant is in operation, the process signal and the like are read in the processing step S1207, and the operation amount signal corresponding to the control rule is calculated and provided to the plant 104 in the processing step S1208.

According to the first embodiment, it is possible to reduce the computer load by contracting the sensor information amount, to retain the sensor information necessary for the special operation that occurs less frequently, and to switch the operation according to the optimum control rule depending on a change in the plant condition.

Second Embodiment

In the first embodiment, it is assumed that the type of sensitivity in the sensitivity estimation unit 109 in the information amount contraction device 101 is set in advance by a user. In other words, it is assumed that which combination of time change to be monitored as for a lot of plant inputs and a lot of process signals is previously grasped and set in advance.

Figure 4:
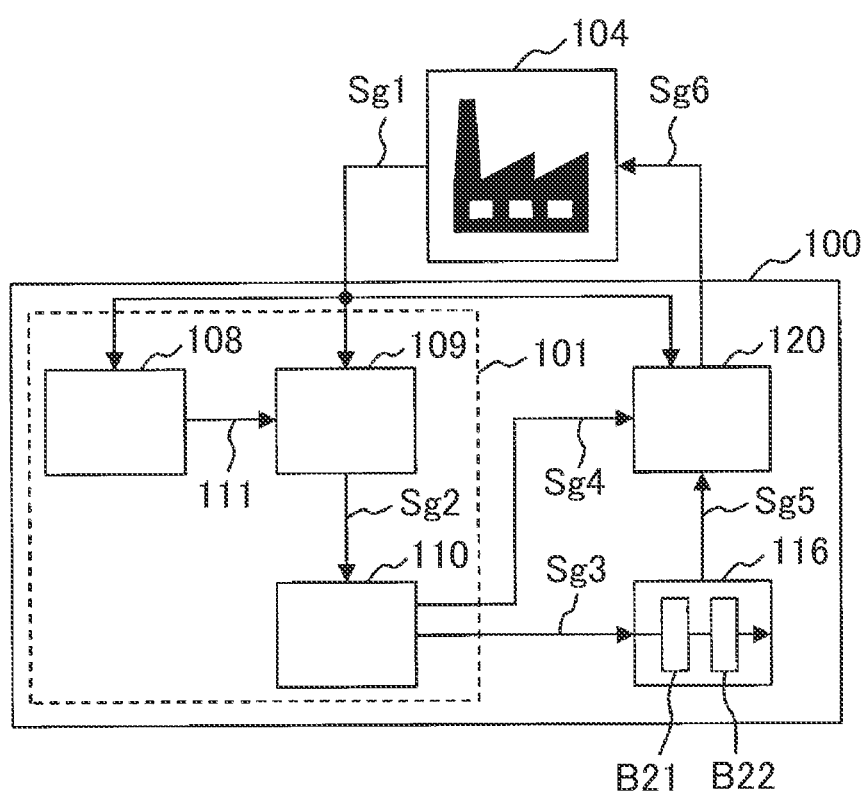
FIG. 4 is a view showing a constitutional example of a plant operation optimization control device according to a second embodiment of the invention.

In contrast, in the second embodiment, also the extraction of the combination is automated. FIG. 4 which shows a constitutional example of the plant operation optimization control device according to the second embodiment, is the same constitution as that of the first embodiment, except that a behavior model learning unit 108 is newly added in the information amount contraction device 101.

In the behavior model learning unit 108, relationships between the operation amount signals Sg6 and the process signals Sg1 before and after the operation are learned in advance using a neural network or the like. This can help to automatically create a combination 111 of input and output with a high input/output correlation. Since the automatic differentiation can be calculated using the relationship obtained by the neural network, the signal sensitivity estimation unit 109 calculates the sensitivity $dy_t/dx_t$ at each time t, by using the characteristics. The behavior model learning unit 108 may present all the combinations; however, this will increase the computer load on the sensitivity estimation unit 109.

Figure 5:
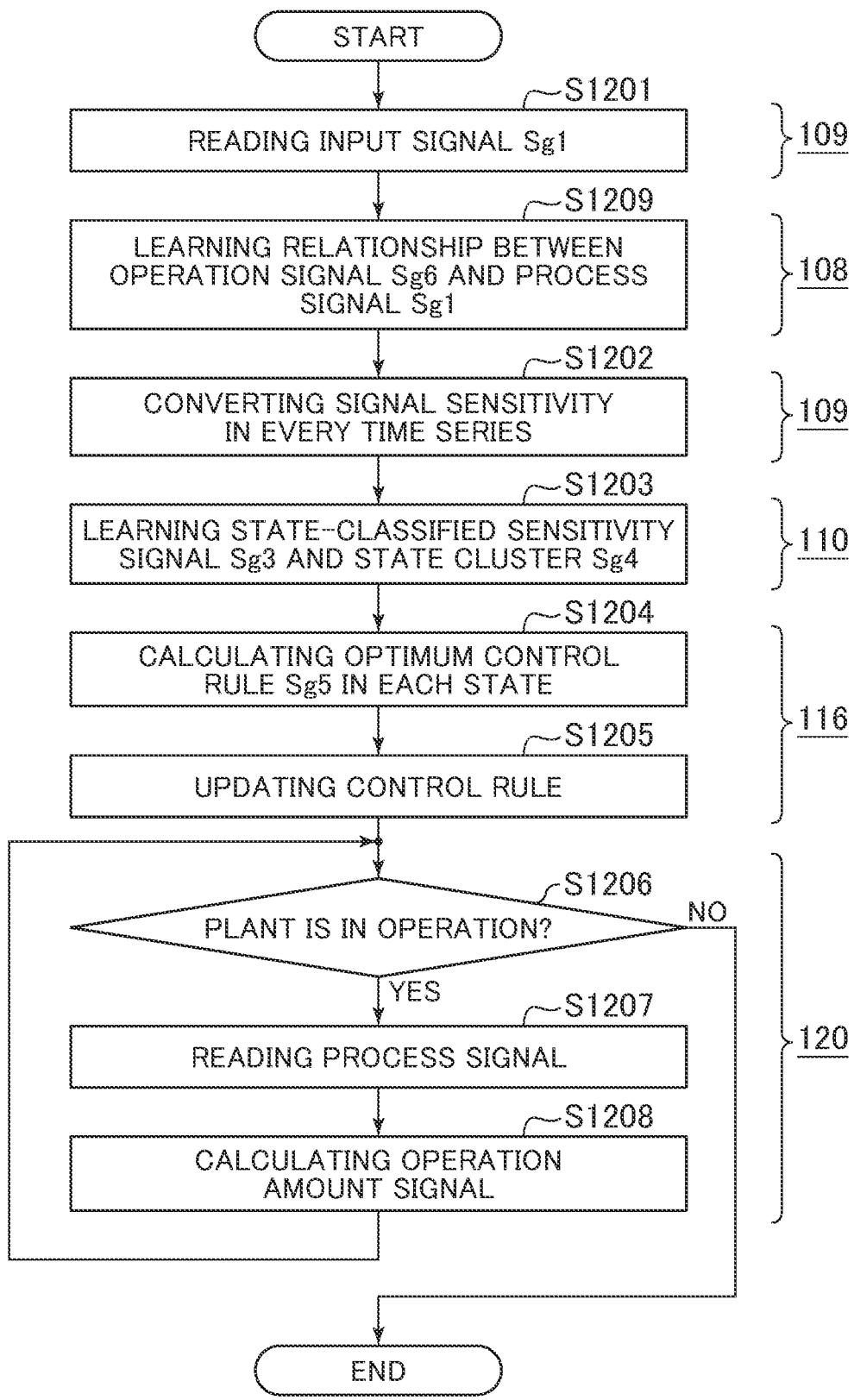
FIG. 5 is a flow chart showing a series of steps in the processing according to a second embodiment of the invention.

FIG. 5 is a flow chart showing a series of steps in the processing according to the second embodiment of the invention. It is different from the processing flow in FIG. 3 in that the processing step S1201 is performed by both the behavior model learning unit 108 and the signal sensitivity estimation unit 109 and that the processing step S1209 is added before the processing step S1202. In the processing step S1209, the relationships between the operation amount signals Sg6 and the process signals Sg1 before and after the operation are learned in the behavior model learning unit 108.

Third Embodiment

The plant operation optimization control device 100 according to the first embodiment and the second embodiment has been described mainly about the constitution of the device and the processing contents from the viewpoint of optimization control, but the constitution and the using mode should be described actually from the viewpoint of a user; therefore, this point will be described in the third embodiment.

Figure 6:
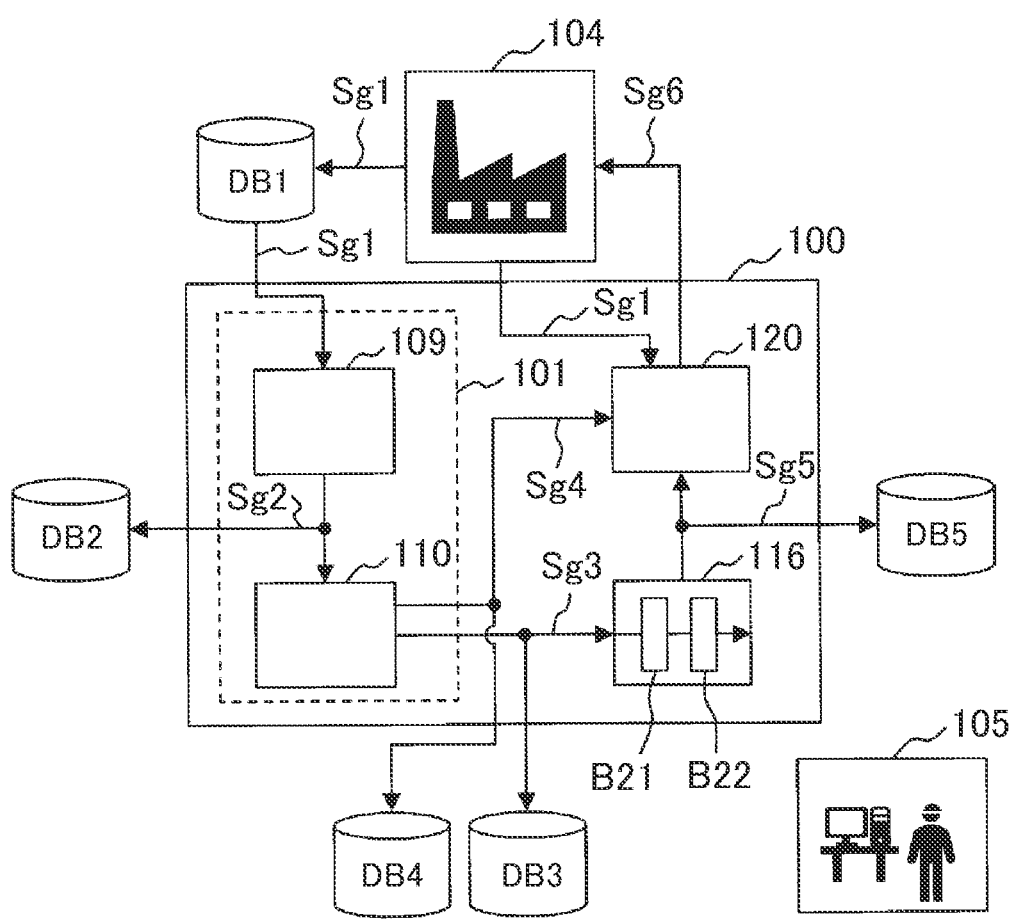
FIG. 6 is a flow chart showing a constitutional example of a plant operation optimization control device according to a third embodiment of the invention.

As a premise, the plant operation optimization control device 100 according to the first embodiment and the second embodiment should be configured with an appropriate database, in which the input data for each unit, the intermediate result data, and the final result data are to be properly stored. In the constitution of FIG. 6, the input signals Sg1 are accumulated in an input data database DB1; the sensitivity signals Sg2, the state-classified high sensitivity signals Sg3, and the operation state cluster signals Sg4 are respectively accumulated in the intermediate result data databases DB2, DB3, and DB4; and the control rule signals Sg5 are accumulated in a final result data database DB5. In the example shown in the figure, the various databases DB are described outside the area of the plant operation optimization control device 100 for convenience of notation, but it goes without saying that they may be placed within the above area.

A user in a control room 105 inputs various signals from these databases DB and he or she can grasp the current status of the plant more accurately according to the information provided in a proper display form on a monitor screen or the like.

Figure 7:
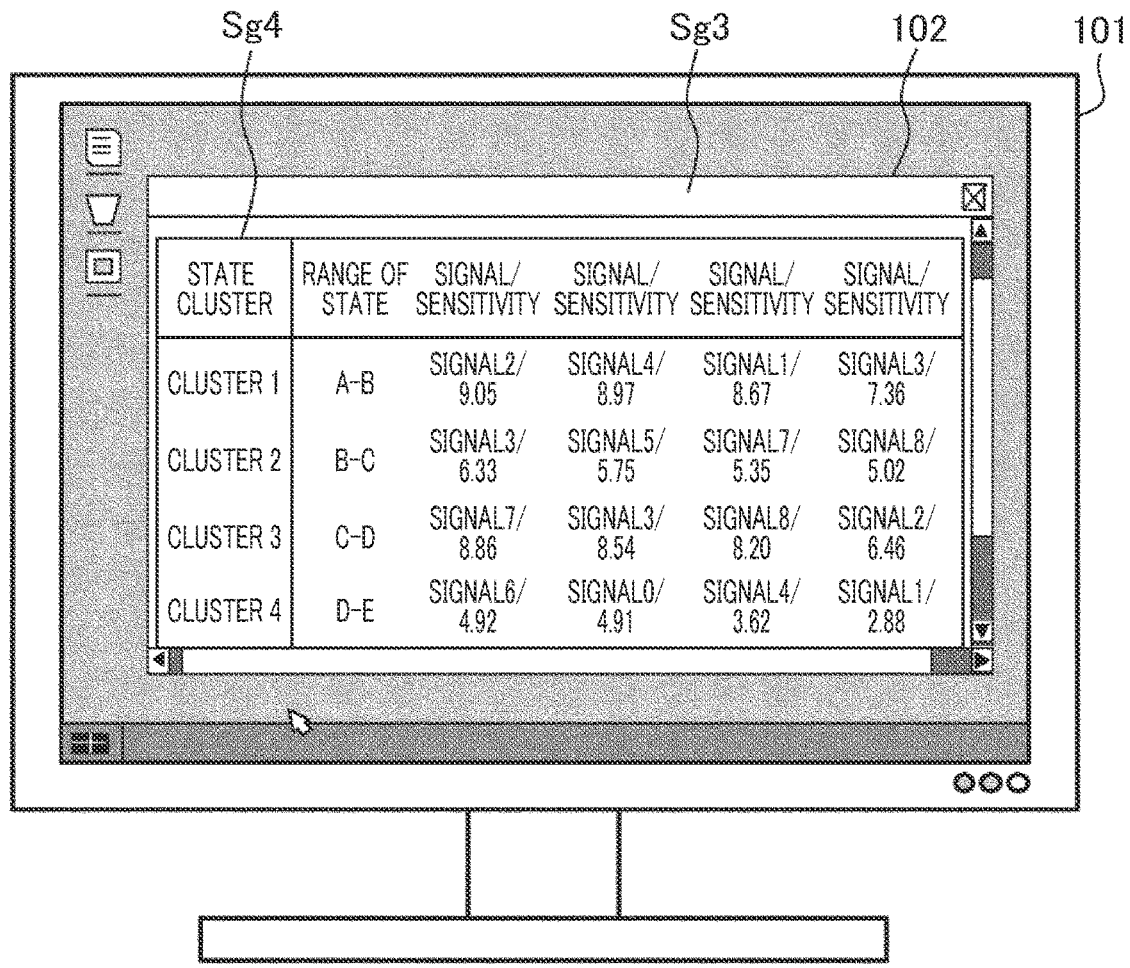
FIG. 7 is a view showing an example of the displayed information on a display device.

FIG. 7 is a view showing a display example of the information on the display device, and on the display screen 102 of the display device 101, the vertical axis shows the clusters determined by the operation state cluster signals Sg4 and the horizontal axis shows the state-classified high sensitivity signals Sg3 together with the type of sensitivity (signal name) and the numerical value. In addition, it is recommended that the range of the operation state should be exemplified as for the clusters as the information showing the contents.

Fourth Embodiment

In a fourth embodiment, a concrete example of a method for realizing the control rule optimization unit 116 will be described.

The control rule optimization unit 116 in FIG. 1 defines the control rule for transition to a target state when the highly efficient operation state of the plant obtained using the high efficiency data (state-classified high sensitivity signal Sg3) is set as the target state. Here, the control rule means the operation amount for each operation condition. The control rule optimization unit 116 is formed by the future state prediction calculation unit B21 and the control rule calculation unit B22. Hereinafter, the processing contents of the control rule optimization unit 116 will be described in detail.

In the control rule optimization unit 116, at first, the future state prediction calculation unit B21 performs the processing for calculating the probability that each point (for example, S1) of the high efficiency data (state-classified high sensitivity signal Sg3) transitions to each another point (for example, S2), what is called the state transition probability matrix. Here, each point s of the high efficiency data group is generally understood as "state". The state transition probability processing can be said to be the processing for future state prediction calculation. In the future state prediction calculation, an attenuated state transition matrix is calculated using the model data (data of the state selected from the viewpoint of a highly efficient operation of the plant). In this case, the object or phenomenon whose future state to be predicted is referred to as a simulated object, and the simulated object in this case is the plant.

The input of the model in the invention means the state and the elapsed time of the simulated object and an influencing factor such as the operation, disturbance, and the like, the output means the state of the simulated object after being affected by the influencing factor, and this model is referred to as a state transition model in this invention. The state transition model represents the state of the simulated object and its surrounding environment at an infinite time or in infinite step destinations, in a finite state space, in a form of probability density distribution.

As an example of a storage format of the state transition model, there can be considered, for example, a state transition probability matrix, a neural network, a radial base function network, or a matrix in which the weights of the neural network or the radial base function network are expressed, but the invention does not restrict the model storage format of the simulated object to these examples.

Figure 8:
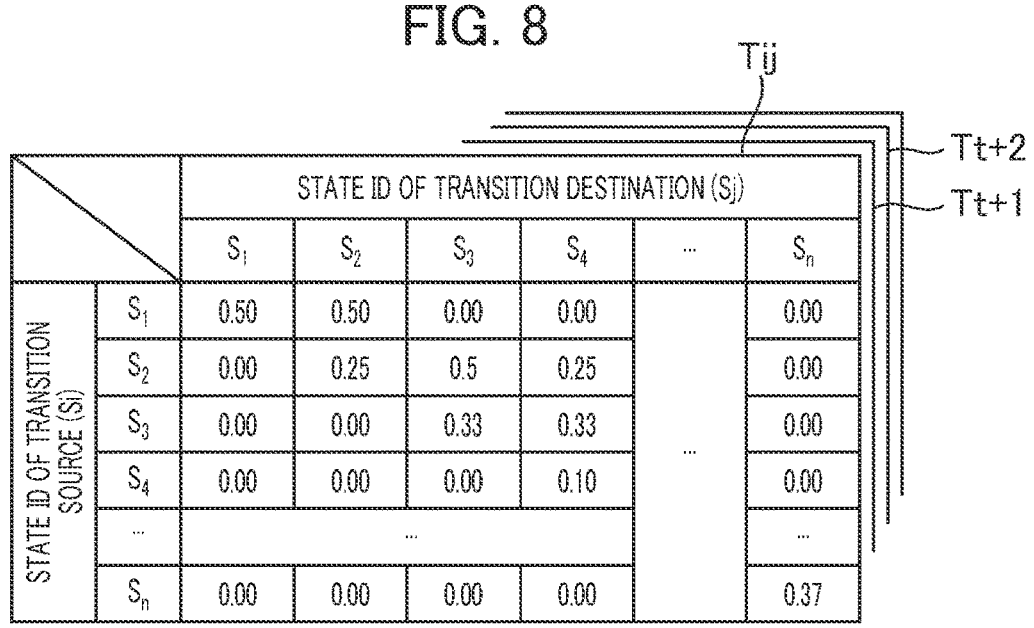
FIG. 8 is a view showing one example when the form of a model is a state transition probability matrix T.

An example in the case where the form of the model is the state transition probability matrix T is shown in FIG. 8. FIG. 8 shows the state of a transition source si (i=1, 2, ..., n) and the state of a transition destination sj (j=1, 2, ..., n) in a horizontal and vertical matrix, and the state transition probability P(sj|si) is displayed numerically in the matrix. The transition probability matrix T is a type of a model that generally simulates the kinematic characteristics and physical phenomena of the control target and is a function or matrix that stores the transition probabilities among all the states. Here, the rows of the table are the states of the transition source si (i=1, 2, ..., n) and the columns are the states of the transition destination sj (j=1, 2, ..., n), and the element Tij is the probability P(sj|si) that the state transitions from the state si to the state sj after elapse of a predetermined interval Δt (or step).

FIG. 8 shows that when focusing on s1 in the state si of the transition source, the probability P(s1|s1) of becoming s1 is 0.5, the probability P(s2|s1) of becoming s2 is 0.5, and the probability P(s3|s1) of becoming s3 and later is zero, in the state sj of the transition destination after the elapsed time Δt. Similarly, it shows that when focusing on s2, the probability P(s1|s2) of becoming s1 is zero, the probability P(s2|s2) of becoming s2 is 0.25, the probability P(s3|s2) of becoming s3 is 0.5, and the probability P(s4|s1) of becoming s4 is 0.25, in the state sj of the transition destination after the elapsed time Δt. Since the table in FIG. 8 shows the probabilities of the state of the transition source and the transition destination to move after the transition, this table can be regarded as a probability density distribution table. The probability density distribution shows, for example, a mountainous shape.

In the above description, the state transition probability matrix T is described by way of example as a table Tij that shows only one cross section before and after the elapsed time Δt; actually, however, a series of tables for every interval of the elapsed time Δt exists and the state transition probability matrix T as the model is formed. The table after the elapsed time Δt in the table Tij is Tt+1, and the table after further the elapsed time Δt is Tt+2.

In the example of FIG. 8, the state s is treated as a discrete space obtained by dividing the whole into the ranges of n parts; however, the state s can be treated as a continuous space by using the neural network, the radial basis function network, and the like. When using the neutral network, the radial base function networks, and the like, the state transition probability matrix T may be substituted in the matrix with the weight coefficient of the input signals entering the neuron and the weight coefficient of the base function as the element values.

The future state prediction calculation unit B21 calculates and records the attenuated state transition matrix from the model data. An example of a method for calculating the attenuated state transition matrix is shown in the following equation (1). In the example of the equation (1), the storage format of the model is assumed as the state transition probability matrix T.

[Math. 1]

$$D = T + \gamma T^2 + \gamma^2 T^3 + \ldots + \gamma^{\infty-1} T^\infty \quad (1)$$

In the equation (1), D is the attenuated state transition matrix, and γ is a constant called an attenuation rate of 0 and more and less than 1. Further, Tk is a function (or matrix) that stores the transition probabilities among all the states after an elapse of a time of Δt×k.

Figure 9:
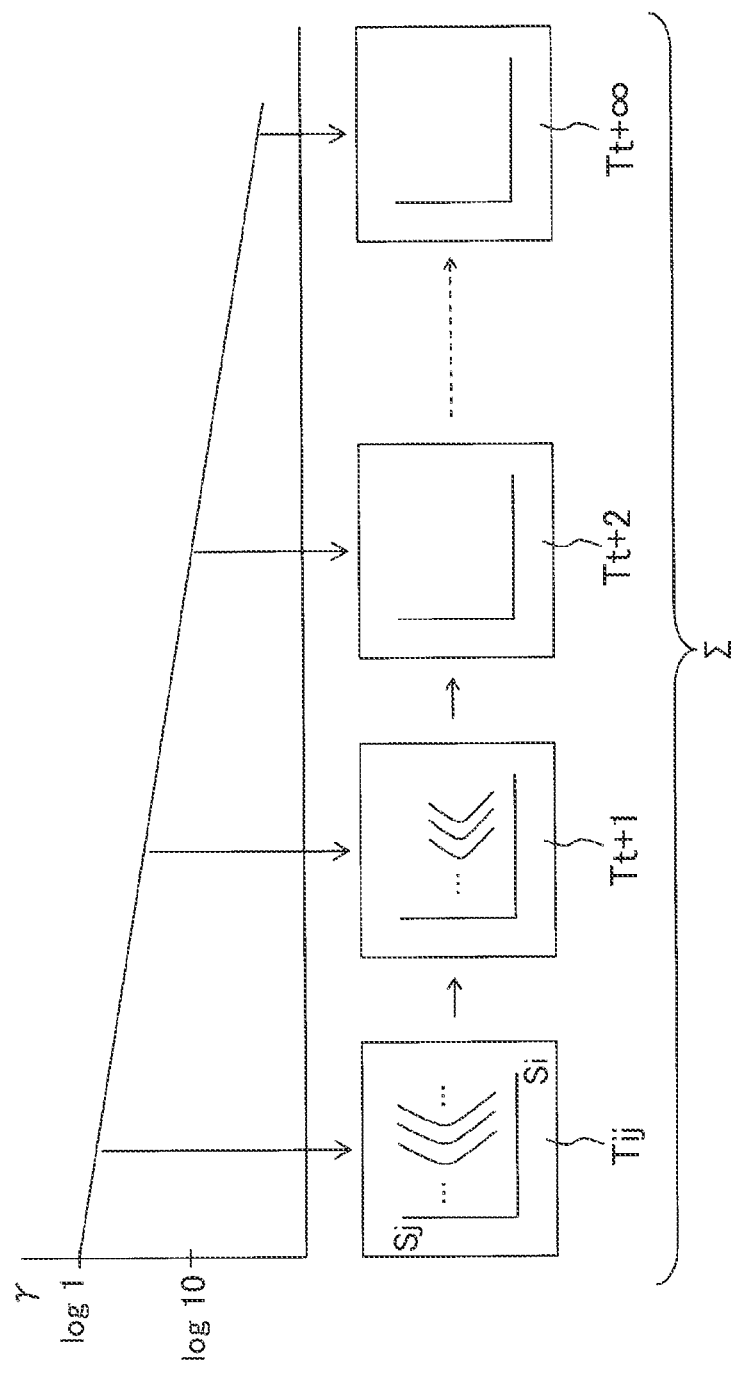
FIG. 9 is a view schematically showing the processing of the equation (1).

FIG. 9 is a view schematically showing the processing of the equation (1) and obtained by multiplying a plurality of state transition probability matrices Tij for every elapsed time Δt in FIG. 8 by the weight coefficient γ that is attenuated in every elapsed time Δt and calculating the total of the above. In FIG. 9, the probability distribution indicating the state si of the transition source and the state sj of the transition destination in the plural state transition probability matrices Tij is grasped, for example, as a mountain-like characteristics group.

Thus, the attenuated state transition matrix D is the sum of the state transition probability matrix T after the elapse of the time Δt to the state transition probability matrix $T^\infty$ after the elapse of the time $\Delta t \times \infty$, and is also a matrix that preserves the statistical closeness among all the states. In order to reduce the weight more in the states to transition in the further future, the above matrix is multiplied by the attenuation rate γ more corresponding to on the elapsed time.

The equation (1) which requires the calculation of the state transition probability matrix T at the present time to the state transition probability matrix $T^\infty$ after the elapse of the time ∞, is difficult to calculate in real time. Therefore, it is better to convert the equation (1) into the following equation (2) to execute the calculation. The equation (2) is to do the calculation equivalent to the series of the state transition probability matrices, in estimating the state of the simulated object and its surrounding environment at infinite time or in the infinite step destinations in the form of probability density distribution.

[Math. 2]

$$D = T(E - \gamma T)^{-1} \quad (2)$$

In the equation (2), E is the unit matrix. The equation (2) is a calculation equivalent to the equation (1). The calculation of the sum of the state transition probability matrix T to the state transition probability matrix $T^\infty$ in the equation (1) is converted into the inverse matrix of (E−γT) in the equation (2), thereby to be able to obtain the same calculation result as in the equation (1) within the finite time. Here, when the state transition probability matrix T is not a linearly independent, a pseudo-inverse matrix may be used. Further, instead of the attenuated state transition matrix D, a matrix having the attenuated state transition matrix normalized by each row may be used.

As mentioned above, by using the model for simulating the behavior of the simulated object as the state transition model, it is possible to calculate the state transition probability after the time Δt×k in the calculation of Tk. In addition, it is possible to calculate the state transition probability with the elapse of the $\Delta t \times \infty$ taken into consideration, within a finite time, by taking the sum of the state transition probability matrix T after the elapse of the time Δt to the state transition probability matrix $T^\infty$ after the elapse of the time $\Delta t \times \infty$ and weighting the operation by the attenuation rate γ according to the elapsed time.

FIG. 10 is an example in the case where the attenuated state transition matrix D calculated by the future state prediction calculation unit B21 is displayed on a screen. In the figure, the attenuated state transition matrix D is displayed on the screen in the form of a matrix with the state si of the transition source and the state sj of the transition destination. Instead of the attenuated state transition matrix D, a matrix having the attenuated state transition matrix D normalized by each row may be displayed on the screen. According to this notation, for example, the probability that the state s1 of the transition source becomes the state s1 after the transition as it is, is 0.14, the probability that the state s1 of the transition source becomes the state s2 after the transition is 0.15, the probability that the above state s1 becomes the state s3 after the transition is 0.09, the probability that the above state s1 becomes the state s4 after the transition is 0.08, and the probability that the above state s1 becomes the state s5 after the transition is 0.25.

Returning to FIG. 1, the control rule calculation unit B22 in the control rule optimization unit 116 calculates and records the optimum control rule (optimum operation amount a) from the attenuated state transition matrix D of the equation (2) obtained by the future state prediction calculation unit B21 and a reward function R of FIG. 9.

The reward function R is to represent the control target such as a target position, a target speed, and the like in the form of function, table, vector, matrix, and the like. In the invention, the function, table, vector, matrix, and the like including the information of this control target are referred to as the reward function R. An example in the case where the reward function is in a form of vector is shown in FIG. 11. In FIG. 11, the reward function R is represented as a numerical value in every state ID of the transition source. According to this figure, the state s is treated as a discrete space obtained by dividing the whole into the ranges of n parts, and the goal is to transition from the initial state to the state s3. Here, the element value of the vector as the target is set at 1 in the state s3 and set at 0 in the other states. In the invention, the element value of this vector and the value of the reward function R are referred to as a reward. As the reward in the control, a desired value or an objective function in reinforcement learning in AI is exemplified.

In short, the above series of the processing is to create the state transition probability matrix from a time-series change of the signal s, with the signal s (state-classified high sensitivity signal Sg3) that is a reference for the plant operation, as the state. At this time, only when calculating the state transition probability, all the high efficiency data is used. Next, the efficiency Y (reward) for the operation condition under which the signal s is realized is learned, and the state in which the state transition probability exceeds a predetermined value and the efficiency Y (reward) is the highest, is determined as the control target. In other words, the above processing is to guide the plant to a condition in which the operation of high efficiency has been achieved.

An example of a method for calculating the optimum control rule in the control rule calculation unit B22 will be shown below. In this example, the calculation is performed in the following three stages to obtain the optimum control rule.

Stage 1: First, a function of storing the approximation (or a statistical index indicating the easiness degree of the transition) of each state s to the state sgoal targeted in the reward function R is calculated. This function is referred to as a state value function V in the invention. Further, the state value function V may be stored in the form of table, vector, matrix, or the like other than the function, and the storage format is not restrictive in the invention. An example of the calculation method of the state value function V is shown in the following equation (3).

[Math. 3]

$$V = DR \quad (3)$$

As shown in the above equation (3), the state value function V is the product of the attenuated state transition matrix D and the reward function R. For example, as shown in FIG. 8 and FIG. 11, when the attenuated state transition matrix D is a matrix of n×n and the reward function R is an n-dimensional vector, the state value function V will be an n-dimensional vector as shown in FIG. 12. The element value of the state value function V gets higher in the state that is more likely to transition to the target state sgoal. In the invention, this element value is referred to as a value. The state value function V in the invention is equivalent in value to the definition of the state value function in the reinforcement learning method.

Stage 2: Next, the state value function V is used to calculate the state sj* that is most likely to transition to the target state sgoal, among the states sj of the transition destination that can transition from the state si of the transition source, as for each state si of the transition source. An example of the calculation method of the state sj* is shown in the following equation (4).

[Math. 4]

$$s_j^* = \underset{s_j}{\mathrm{argmax}}\,(T(s_i, s_j)V(s_j)) \quad (4)$$

Here, T (si, sj) is the element value of the si row and sj column in the state transition probability matrix T. FIG. 13 shows an example of the calculation results of the equation (4). In FIG. 13, the state IDs (sj) of the transition destination are respectively shown in the state IDs (si) of the transition source. According to FIG. 13, when the state of the transition source is the state s1, the state of the possible transition destination is either of the two, the state 1 or the state 2, in the state transition probability matrix T (FIG. 8). Of these two states, the state s2 is higher in the value in the state value function V. Therefore, in the example of FIG. 13, the state s2 is stored as the state of the transition destination of the transition source state s1.

Stage 3: In the final stage, the operation amount a required to transition from each state si of the transition source to the state sj* obtained in Stage 2 is calculated. The operation amount a can be calculated, for example, by obtaining an inverse model of the plant (a model that outputs the corresponding operation amount a, after inputting the state si of the transition source and the state sj*). As the calculation results in Stage 3, for example, the control rule as shown in FIG. 14 can be obtained.

In FIG. 14, the operation amount ID is expressed as a numeric value in every state ID (si) of the transition source. According to this figure, the state si is treated as a discrete space obtained by dividing the whole into the ranges of n parts, and the optimum operation amount ac (c=1, 2, . . . , m) is stored for each state range.

As mentioned above, by calculating the value in the above equation (3), it is possible to evaluate the easiness of the transition to sgoal in each state, to specify the state sj* that is easiest to transition to sgoal, among the states possible to transition according to the elapse of the time Δt, by the above equation (4), and to specify the operation amount a to transition to the state sj* by the inverse model.

LIST OF REFERENCE SIGNS

100: plant operation optimization control device
101: information amount contraction device
104: plant 104
109: sensitivity estimation unit
110: signal classification unit
116: control rule optimization unit
120: control device 120
Sg1: input signal
Sg2: sensitivity signal
Sg3: state-classified high sensitivity signal
Sg4: operation state cluster signal
Sg5: control rule signal
Sg6: operation amount signal (control amount signal)
B21: future state prediction calculation unit
B22: control rule calculation unit

The invention claimed is:

1. A plant operation optimization support device for improving an efficiency of a plant operation, the plant operation optimization support device in communication with a processor, memory and storage, the plant operation optimization support device comprising:
   an input device that inputs an operation amount signal provided to a plant and a process signal detected by the plant as input signals;
   a sensitivity estimation device that requires a time-series change of the process signal as for the operation amount signal, as a sensitivity signal;
   a signal classification device that classifies an operation state of the plant from the input signals to provide an operation state signal and that extracts the sensitivity signal indicating a high sensitivity from the sensitivity signals in every classified operation state, as a state-classified high sensitivity signal;
   a display device configured to present the operation state signal and the state-classified high sensitivity signal provided by the signal classification device as a displayed data;
   a control device that determines the operation amount signal provided to the plant based upon the displayed data including at least the operation state signal and the state-classified high sensitivity signal, and
   a control rule optimization device that, on receipt of the state-classified high sensitivity signal, determines an optimized control rule in a plant control for transition to a target state and provides the above as a control rule signal to the control device, when a high efficiency operation state of the plant is defined as the target state,
   wherein based upon at least the state-classified high sensitivity signal, an amount of data from the input signals required for the determination of the operation amount signal is reduced, and
   the plant operation transitions to the target state based upon the optimized control rule.

2. A plant operation optimization control device for improving an efficiency of a plant operation, the plant operation optimization control device in communication with a processor, memory and storage, the plant operation optimization control device comprising:

an input device that inputs an operation amount signal provided to a plant and a process signal detected by the plant as input signals;

a sensitivity estimation device that requires a time-series change of the process signal as for the operation amount signal, as a sensitivity signal;

a signal classification device that classifies an operation state of the plant from the input signals to provide an operation state signal and that extracts the sensitivity signal indicating a high sensitivity from the sensitivity signals in every classified operation state, as a state-classified high sensitivity signal;

a control rule optimization device that, on receipt of the state-classified high sensitivity signal, determines an optimized control rule in a plant control for transition to a target state and provides the above as a control rule signal, when a high efficiency operation state of the plant is defined as the target state;

a display device configured to present the control rule signal provided by the control rule optimization device and the operation state signal and the state-classified high sensitivity signal provided by the signal classification device as a displayed data; and a control device that determines the operation amount signal provided to the plant using the displayed data including the control rule signal obtained from the state-classified high sensitivity signal during a time of the operation state signal, wherein as a result of the operation amount signal obtained based upon the state-classified high sensitivity signal an amount of data from the input signals required for the determination of the operation amount signal is reduced, and the plant operation transitions to the target state based upon the optimized control rule.

3. A plant operation optimization support method for improving an efficiency of a plant operation, the plant operation optimization support method comprising:

inputting an operation amount signal provided to a plant and a process signal detected by the plant as input signals;

requiring a time-series change of the process signal as for the operation amount signal, as a sensitivity signal;

classifying an operation state of the plant from the input signals to provide an operation state signal and extracting the sensitivity signal indicating a high sensitivity from the sensitivity signals in every classified operation state, as a state-classified high sensitivity signal;

presenting the operation state signal and the state-classified high sensitivity signal provided by the classification and extraction to a user on a display device as a displayed data; and determining the operation amount signal provided to the plant based upon the displayed data including at least the operation state signal and the state-classified high sensitivity signal, and on receipt of the state-classified high sensitivity signal, determining an optimized control rule in a plant control for transition to a target state and providing the above as a control rule signal, when a high efficiency operation state of the plant is defined as the target state, wherein based upon at least the state-classified high sensitivity signal an amount of data from the input signals required for the determination of the operation amount signal is reduced, the plant operation transitions to the target state based upon the optimized control rule.

4. A plant operation optimization control method for improving an efficiency of a plant operation, the plant operation optimization support method comprising:

inputting an operation amount signal provided to a plant and a process signal detected by the plant as input signals;

requiring a time-series change of the process signal as for the operation amount signal, as a sensitivity signal;

classifying an operation state of the plant from the input signals to provide an operation state signal and extracting the sensitivity signal indicating a high sensitivity from the sensitivity signals in every classified operation state, as a state-classified high sensitivity signal;

determining an optimized control rule in a plant control for transition to a target state and providing the above as a control rule signal, using the state-classified high sensitivity signal, when a high efficiency operation state of the plant is defined as the target state;

presenting the control rule signal provided by the determination and the operation state signal and the state-classified high sensitivity signal provided by the classification and extraction to a user on a display device as a displayed data; and determining the operation amount signal provided to the plant using the displayed data including the control rule signal obtained from the state-classified high sensitivity signal during a time of the operation state signal, wherein as a result of the operation amount signal obtained based upon the state-classified high sensitivity signal an amount of data from the input signals required for the determination of the operation amount signal is reduced the plant operation transitions to the target state based upon the optimized control rule.

* * * * *